United States Patent [19]
Anderson

[11] 3,954,505
[45] May 4, 1976

[54] MULTICELL ALKALINE PRIMARY BATTERY

[75] Inventor: Kent V. Anderson, Madison, Wis.

[73] Assignee: ESB Incorporated, Philadelphia, Pa.

[22] Filed: Apr. 14, 1975

[21] Appl. No.: 568,044

[52] U.S. Cl. .............................................. 136/110
[51] Int. Cl.² ........................................ H01M 6/06
[58] Field of Search ............................ 136/108–111

[56] References Cited
UNITED STATES PATENTS 2,983,899   5/1961   Amodico et al. .............. 136/110 X

*Primary Examiner*—Howard S. Williams
*Assistant Examiner*—C. F. LeFevour
*Attorney, Agent, or Firm*—Anthony J. Rossi; Wm. Wharton Smith; Robert H. Robinson

[57] ABSTRACT

An alkaline primary battery has at least two cells. The cells are of the type where the anode material (zinc) is in the form of a powder suspended in a gel and is located in the central portion of the cell. The anode current collector for the second cell is made as an integral portion of the first cell and takes the form of a metal rod dependent from the base of the first cell. The cells are built without anode current collectors. In the assembly of a battery from such cells, the anode current collector attached to a first cell is forced through the cover of a second cell and embeds itself in the anode structure of the second cell. The anode collector for the first cell is in the form of a loose metal rod and is similarly forced through the cover and into the anode structure of the cell. The end cell opposite to the first cell is similar to the other cells except that it does not have a current collector attached to its base.

9 Claims, 2 Drawing Figures

MULTICELL ALKALINE PRIMARY BATTERY

BACKGROUND OF THE INVENTION

1. Field of the Invention

This invention relates to electrogalvanic batteries. In particular, it relates to multicell primary batteries having anodes of zinc, cathodes of manganese dioxide and an alkaline electrolyte.

2. Description of the Prior Art

Single cell primary batteries using zinc or amalgamated zinc anodes with the zinc in the form of a powder suspended in a gel, cathodes such as manganese dioxide, mercuric oxide, nickel hydrate and silver oxide and an alkaline electrolyte are well known in the dry battery art. Such batteries have been described wherein the anode current collector takes the form of a rod of metal, such as a nail or a woodscrew embedded in the gel of the anode. Flat type multicell dry cell batteries are known where the electrical connection from cell to cell is made by a sharply pointed member attached to one cell. The point of the member of a first cell penetrates a plastic skin covering a second cell and touches a zinc or carbon sheet within the cell to form an electric contact.

It is known that it is difficult to seal the terminal of an alkaline cell against the egress of the cell electrolyte. This is particularly true of the negative or anodic terminal. Special seals and sealing methods have been proposed to solve this difficult problem.

SUMMARY OF THE INVENTION

A first cell of a multicell alkaline battery has a metallic container. A current collector is welded to the bottom of the container and extends outwardly therefrom. A second cell containing an anode in the form of metal particles suspended in a gel is located adjacent to the first cell. The current collector attached to the base of the first cell penetrates the cover of the second cell and is embedded in the gel anode thereof.

The battery resulting from this assembly method is noteworthy in two important respects. First, the cell to cell contact is short in length and electrically solid. Second, compared with presently known alkaline battery constructions it has fewer parts and hence can be produced at a lower price than other batteries now presently available. A further advantage of the battery is that it has a built-in stiffness so that it will require only a modest outside covering to provide a mechanically strong multicell unit. Finally, individual cells may be stored without deterioration prior to battery assembly.

DESCRIPTION OF THE PREFERRED EMBODIMENT

Figure 1:
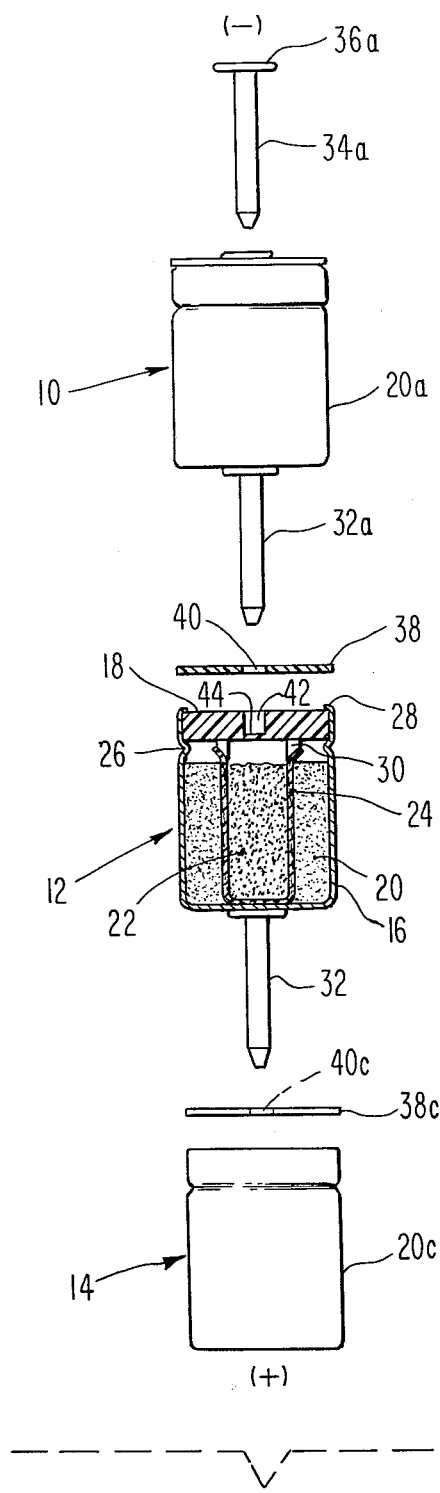
FIG. 1 illustrates in elevation and partial cross section the several parts required to assemble a 3 cell battery of the present invention; and, FIG. 2 illustrates the same parts fully assembled into a battery.

Items 10, 12 and 14 represent the 3 cylindrical cells of a 3 cell battery of the invention prior to the assembly thereof. Cells 10 and 14 are shown in full. Cell 12 is shown in diametric cross section. In cell 12, a container 16 and cover 18 contain the active cell ingredients. These include, the cathode mix 20 of tubular form in electrical contact with the can 18; the anode mix 22 in cylindrical form, and a tubular separator 24 separating the cathode mix from the anode mix. An electrolyte permeates the pores of the cathode mix, the anode mix and the separator. In the design shown, the cover 18 is a continuous piece of stiff molded plastic such as polyethylene, polypropylene, methyl methacrylate, nylon, etc. It is clamped and sealed between the bead 26 and the flange 28 both formed at the upper part of the container 16. Other cover designs anc clamping means known in the art may also serve. The container 16 is made of metal such as steel, plated steel, stainless steel, nickel, etc. In the design shown, it is of drawn construction so that there are no seams therein. The cathode mix 20 or positive active material comprises a pressed tubular pellet. In the several electrode systems for which the invention is suitable, the cathode active material may be manganese dioxide, mercuric oxide, nickel hydrate, or mono or divalent silver oxide. The cathode materials may be mixed in with conductive material such as carbon powder, graphite, or metal powders as is well known in the galvanic battery art. The anode mix 22 or negative active material comprises metallic zinc powder or amalgamated zinc powder suspended in a gel such as carboxeymethylcellulose. This form of negative is well known in the art. The gel has the consistency of a heavy oil. It is added to the cell as a high viscosity liquid. The material is thixotropic and becomes a gel upon standing. The separator 24 may be a paper, a synthetic fiber felt or other similar article as well known in the art. The electrolyte (not shown) is an aqueous solution of sodium hydroxide, potassium hydroxide or mixed sodium and potassium hydroxides. The strength is from 30 to 40% hydroxide. These electrolytes are all well known in the battery art.

A collar 30 dependent from the cell cover 18 makes an interference fit with the top of the separator 24 and seals the anode compartment from the cathode compartment. Cell 12 as shown is complete except that it has no current collector for the anode. This part comprises the nail-like rod 32 dependent from the bottom of the container 20a of the first cell directed away from the bottom of the cell and electrically and mechanically attached thereto. The rod may be tin plated steel, brass, bronze, etc. It should be a good conductor of electricity and it should be structurally strong. The fastening means might be a solder. However, for best conductivity and maximum strength, it is preferred to weld the current collector 32a to the bottom of the container 20a. The container 20 of cell 12 likewise has a current collector 32 attached to the bottom thereof to serve as the current collector of cell 14. The battery of this description has been chosen to be a 3 cell battery although the teaching of the present invention applies to batteries having 2 or more cells. Cells 10 and 14 are end or terminal cells. Because cell 14 is a terminal cell, it does not have a rod dependent from the bottom thereof. The positive terminal of the battery is the can 20c itself. However, if a fastener type contact should be required, it could be welded to the bottom of the can 20c. Cell 10 requires a current collector. This is provided by a separate piece 34a having the same size and shape as collectors 32 and 32a. The collector 34a shown, has a head 36a to serve as the negative terminal of the battery. If a fastener type terminal (negative) is required for the battery, it can form a part of or be attached to the upper end of the collector 34a.

In a multicell battery assembly, it is important that the metallic containers of adjacent cells do not touch as this would directly short-out a cell. As one means of insulating the cell pile, discs 38 and 38c made of a dielectric material are supplied. These discs are about the same diameter as the several cells and have a centrally located hole 40 and 40c.

To assemble a battery from the parts listed above, collector 34a is pressed through the cover (not shown) of cell 10 until the head 36a rests on the cover. The disc 38 is placed upon collector 32a. 32a is pressed through the cover 18 and into the anode gel 22 until disc 38 rests firmly on the flange 28 and the head of collector 32 rests on the disc 38. The current collector 32a thus passes through the cover of cell 12 and is embedded in and is in electrical contact with the anode mix 22 of cell 12. It may be desirable to form the cover 18 with a depression 42 so that the collector 32a may be properly centered and directed in the assembly.

It is to be noted that whether the cover is flat or includes the depressions 42 with a web 44 at the bottom thereof it is continuous and seals the cell against loss of moisture to the atmosphere. Because the seal is present even when cells are not assembled as batteries, individual cells may be stored for considerable periods of time. This in turn allows the cells to be built in large quantities and assembled into batteries at later times in accordance with any particular order.

Figure 2:
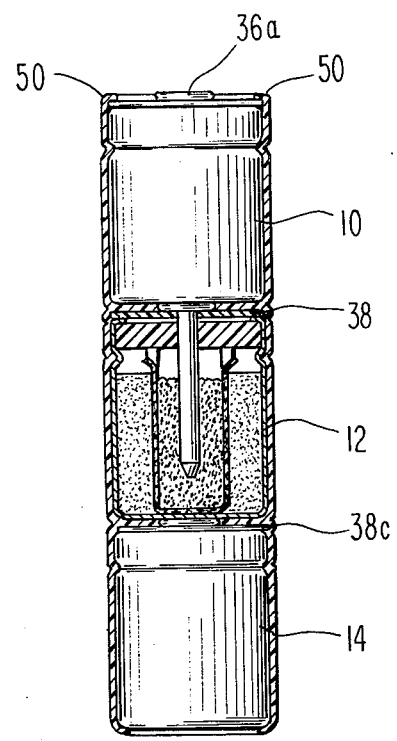

In the same manner, Cell 14 is assembled onto the collector 32 of cell 12. FIG. 2 shows the assembly as described. To further strengthen the battery and insulate it, the cylindrical sides of the battery may be covered with an insulating casing such as a paper or plastic wrapping, a pasteboard tube or a plastic tube shrunk over the assembly as shown in cut away form by 50.

A very critical part of this assembly and one that is vital to its success is the seal between the collectors 34a, 32a and 32 and the covers of cells 10, 12 (item 18) and 14. There are a number of coatings known in the art such as bitumen, heavy grease, etc., that can be placed on the upper portions of the collectors to improve the seal. Cement materials such as certain epoxy compounds can be applied. The fit between the collector and depression 42 can be interference fit, and the collector can be slightly tapered so as to slightly compress the cover material against the metal collector. U.S. Pat. No. 3,713,896 describes a number of sealing means suitable for the present assembly.

It will be noted from this description that a simple means has been developed for the assembly of multicell alkaline type dry cell batteries. Cells so built may be stored for considerable time periods prior to use as individuals and then assembled into multicell batteries of various voltages suitable to meet the customer needs of the moment. The battery described is a cylindrical battery. However, the invention is not limited to cylindrical cells alone as it would be equally effective for oval, rectangular or other cell shapes.

Having described my invention, I hereby claim:

1. A multicell alkaline cell battery which comprises:
  a. a first cell comprising a top, a metallic container attached to the top forming the sides and the bottom of the cell, within the container an anode mix, a cathode mix in electrical contact with the container, a separator located between the anode mix and the cathode mix, an electrolyte within pores of the anode mix, the cathode mix and the separator and attached to the bottom of the container directed away therefrom a metallic current collector; and,
  b. a second cell comprising a top, a metallic container attached thereto, within the container a cathode mix, in electrical contact therewith an anode mix, a separator between the anode mix and the cathode mix, and an electrolyte located in pores of the anode mix, the cathode mix and the separator, the battery being further identified in that the current collector attached to the bottom of the first cell passes through the top of the second cell, is embedded in and is in electrical contact with the anode mix of the second cell.

2. A battery as defined in claim 1 including an insulatng washer, the insulating washer defining a hole therethrough, the current collector passing through said hole, said insulator electrically insulating the container of the first cell from the container of the second cell.

3. A battery as defined in claim 1 wherein the current collector is in the form of a nail having an enlarged head, the attachment of the nail to the bottom of the container of the first cell being at the head of said nail.

4. A battery as defined in claim 1 wherein the anode mix of each cell comprises zinc powder and a gel forming material and the cathode mix of each cell includes a material selected from the group which consists of manganese dioxide, mercuric oxide, nickel hydrate, monovalent silver oxide and divalent silver oxide.

5. A battery as defined in claim 1 wherein the electrolyte of the first cell and the second cell is an aqueous solution of a material selected from the group which consists of sodium hydroxide, potassium hydroxide and mixed sodium and potassium hydroxides.

6. A battery as defined in claim 1 including an insulating casing covering the sides of the battery.

7. A battery as defined in claim 1 including a seal between the current collector and the cover through which it passes, the seal being identified by the presence of a material selected from the group which consists of bitumen heavy grease and epoxy resin, between cover and collector.

8. A multicell battery as defined in claim 1 wherein a current collector similar to that attached to the bottom of the first cell passes through the top of the first cell, is embedded in and is in electrical contact with the anode mix of the first cell.

9. The method of assembling a multicell alkaline battery having a first cell comprising a top, a metallic container attached to the top forming the sides and the bottom of the cell, within the container an anode mix, a cathode mix in electrical contact with the container, a separator located between the anode mix and the cathode mix, an electrolyte within pores of the anode mix, the cathode mix and the separator and attached to the bottom of the container directed away therefrom a metallic current collector, and a second cell comprising a top, a metallic container attached thereto, within the container a cathode mix in electrical contact therewith, an anode mix, a separator between the anode mix and the cathode mix, and an electrolyte located in pores of the anode mix, the cathode mix and the separator, the battery being further identified in that the current collector attached to the bottom of the first cell passes through the top of the second cell, and is embedded in and is in electrical contact with the anode mix of the second cell which comprises:
  a. placing the first cell above the second cell;

b. passing the current collector attached to the bottom of the first cell through the top of the second cell;

c. embedding the collector in and contacting the collector with the anode mix of the second cell.

* * * * *